Feb. 28, 1961  T. H. McCONICA  2,972,762
ADJUSTABLE LOADING RAMP
Filed May 9, 1958  2 Sheets-Sheet 1

INVENTOR.
THOMAS H. McCONICA

BY *Learman, Learman & McCulloch*

ATTORNEYS

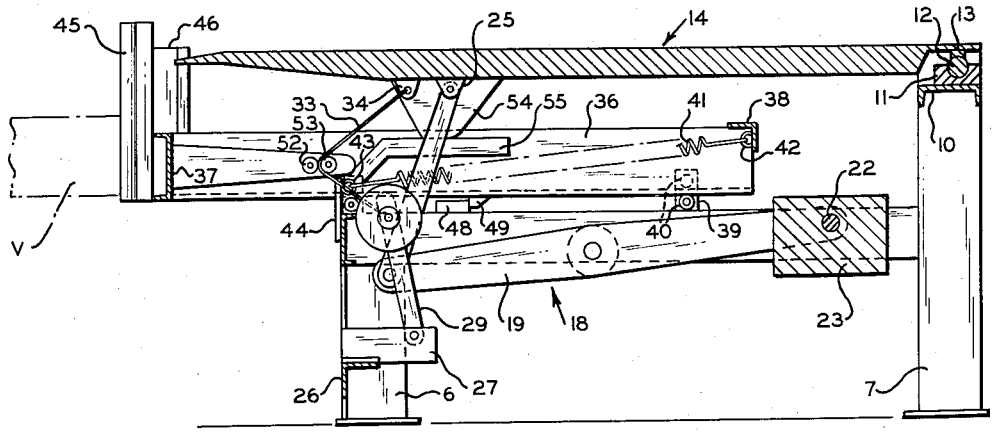

United States Patent Office 2,972,762
Patented Feb. 28, 1961

2,972,762

ADJUSTABLE LOADING RAMP

Thomas H. McConica, Clare, Mich., assignor to Loomis Machine Company, Clare, Mich., a corporation of Michigan Filed May 9, 1958, Ser. No. 734,352

7 Claims. (Cl. 14—71)

This invention relates to adjustable loading ramps of the kind adapted for use in conjunction with loading docks and more particularly the invention pertains to an adjustable loading ramp construction having a ramp or bridge member automatically adjustable to the height of the load carrying bed of a vehicle to be loaded or unloaded.

Loading ramps of the general class to which the invention relates are intended primarily for use in conjunction with loading docks or platforms to or from which material is to be delivered from or to a vehicle such as a truck. Most of these docks or loading platforms have their load receiving surfaces located at a height corresponding substantially to the average height of the load carrying beds of trucks, but not all trucks have their load carrying beds located at the same height above the ground. Moreover, the level of the load carrying bed of a vehicle will vary as cargo is loaded in or unloaded from the vehicle. A fixed height loading dock, therefore, has certain disadvantages such as having its load receiving surface located at a level different from the load carrying bed of the vehicle, with the result that cargo transferred from the vehicle to the dock, or vice versa, is likely to be subjected to harmful shocks or jars. A fixed height dock also is objectionable in that it seldom is possible to locate the vehicle relatively to the dock in such manner that no gap exists between the dock surface and the load carrying bed of the vehicle. Thus, the transfer of cargo is likely to be subjected to jars and shocks caused by a gap between the vehicle bed and the loading dock.

Various proposals have been made heretofore for overcoming the objectionable characteristics of fixed loading docks, the most successful of which appears to be the use of a loading ramp or bridge pivoted to swing about a horizontal axis and being of such length as to project beyond the forward end of the dock, the ramp or bridge thus being adjustable to the height of the load carrying bed of the vehicle and being capable of having its forward end rest on the load carrying bed so as to bridge any gap between the bed and the loading dock.

There recently have been developed automatically operating loading ramp constructions in which a bridge or ramp normally is located at a level corresponding to the level of a dock with which it is used, but which is adjustable to the level of a vehicle bed by actuating means located in the path of and operated by the vehicle to be loaded or unloaded. Some of the automatically operable loading ramps are so constructed and arranged as to be biased to an elevated position when not in use, whereas others are biased to a lowered or dock level position. The latter constructions are advantageous inasmuch as cross traffic over the ramps is possible during their periods of inactivity. In constructions of the kind just referred to, it has been customary to provide only an approximate counterbalance for the ramp so that it tends normally to swing by gravity to its lower or dock level position. Consequently, it has been necessary to provide cams or equivalent structures to assist the counterbalance in overcoming the weight of the ramp and elevating the ramp during movement of the vehicle towards the dock so as to raise the ramp and prevent damage of its leading end by the backing vehicle.

An object of this invention is to provide an adjustable loading ramp which normally is biased to an elevated or raised position and which includes means operable during periods of inactivity of the ramp to disable the biasing means and position the ramp at dock level so as to permit cross traffic over the ramp.

Another object of the invention is to provide an adjustable loading dock of the kind referred to and including means automatically operable by the vehicle to be loaded or unloaded for enabling the ramp biasing means to swing the ramp upwardly out of harm's way as the vehicle approaches the dock.

A further object of the invention is to provide an adjustable loading ramp of the kind described including overbalancing means effective automatically upon movement of a vehicle into loading or unloading position to swing the loading ramp to such position that its forward end is located at the level of the vehicle bed and bridges any gap existing between the bed and the dock.

Other objects and advantages of the invention will be pointed out specifically or will become apparent from the following description when it is considered in conjunction with the appended claims and the accompanying drawings, in which:

Figure 3 is a side elevational view, partly in section, illustrating the loading ramp parts in positions they occupy during periods of inactivity;

Figure 4 is a view similar to Figure 3, but showing the apparatus in its initial stages of operation by a vehicle having a bed to be loaded or unloaded; and Figure 5 is a view similar to Figures 3 and 4, but showing the parts in the positions they occupy during loading and unloading operations of a vehicle.

Figure 1:
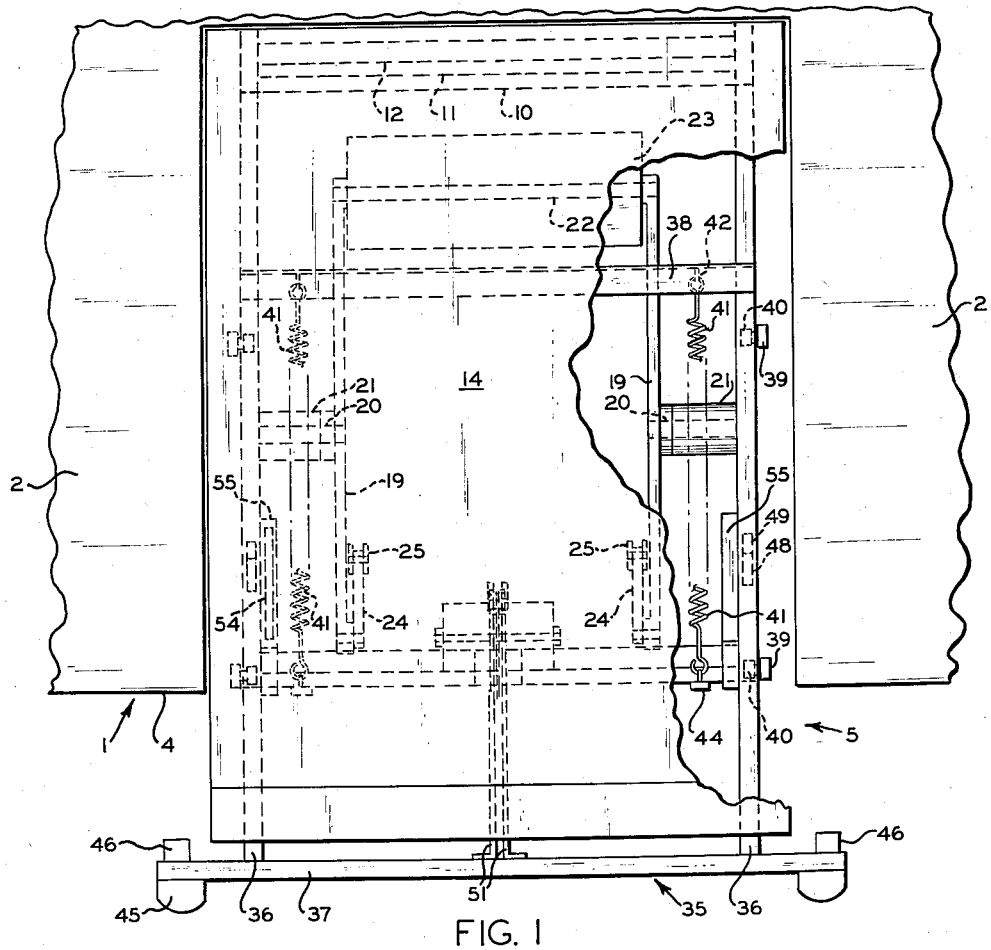
Figure 1 is a fragmentary top plan view of a loading dock having associated therewith an adjustable loading ramp constructed in accordance with the invention.
Figure 2:
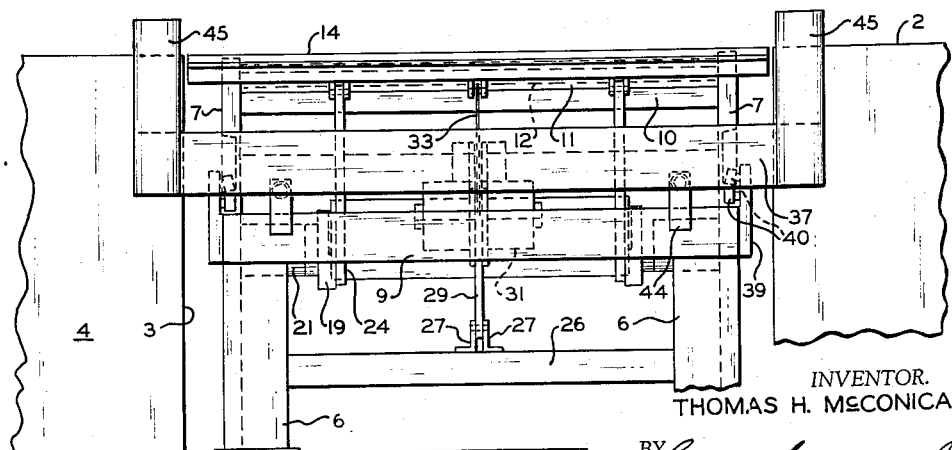
Figure 2 is a front elevational view of the construction shown in Figure 1.

Apparatus constructed in accordance with the invention is adapted for use in conjunction with a loading dock 1 having a load supporting surface 2 which preferably is substantially horizontal. In a preferred construction, the loading dock 1 will have a recess 3 therein extending rearwardly from the front edge 4 of the dock and in which the adjustable loading ramp construction designated generally by the reference character 5 may be received.

The loading ramp construction 5 may include a supporting framework comprising front legs 6, rear legs 7 and longitudinally extending side frame members 8 connected at their respective ends to the legs 6 and 7 in any suitable manner such as by welding. The supporting framework also preferably includes a front channel or beam 9 secured at its opposite ends to the front legs 6. As is best shown in Figures 3–5, the rear legs 7 of the supporting framework are longer than the front legs 6 and support adjacent to their upper ends a horizontal channel member 10 on which is fixed a trunnion block 11 in which is rockably mounted a shaft 12. The shaft 12 preferably is welded or otherwise suitably secured to the rear end 13 of a swingable ramp member 14. The construction and arrangement of the parts thus far described are such that the ramp member 14 is hingedly or pivotally mounted adjacent to its rear end for swinging movements about a substantially horizontal axis. As is best shown in Figure 1, the length of the ramp 14 is such that its load supporting surface 15 extends beyond the front wall 4 of the dock and the leading edge 16 of the ramp is tapered and shaped to form a relatively thin lip portion 17.

Means designated generally by the reference character 18 is provided for biasing the ramp member 14 to swing upwardly about the axis of the shaft 12. The biasing means may comprise a pair of levers 19 rockably mounted on stub shafts 20 journalled in bearing supports 21 fixed to the side frame members 8. At the rear ends of the levers 19 is mounted a shaft 22 on which is pivotally supported a counterweight 23 and at the forward end of each lever 19 is pivotally connected one end of a link 24, the other end of the link being pivoted to an ear 25 welded or otherwise suitably secured to the under surface of the ramp member 14. The parts of the biasing means 18 are so constructed and arranged relatively to one another and to the ramp member 14 that the counterweight 23 overcomes the weight of the ramp 14 and exerts a force on the latter tending to swing it upwardly to the position shown in Figure 4.

Adjacent to the lower ends of the front legs 6 of the supporting framework is welded or otherwise suitably secured a mounting beam 26 which spans the distance between the legs 6. At substantially the center of the mounting beam 26 is welded or otherwise suitably secured a pair of brackets 27. An overbalancing device 28 comprises a link or lever 29 pivoted at one end by means of a pin 30 to the brackets 27, the other end of the lever 29 having secured thereto a weight 31 by means of a stud 32 which projects from the lever 29. The overbalancing device 28 is capable of shifting or swinging freely about the horizontal axis of the pivot 30 to positions located on either side of a vertical plane passing through the pivot. Stop means is provided, however, for limiting swinging movement of the weight in a counterclockwise direction, as is viewed in Figures 3–5, and such stop means conveniently may comprise the horizontal frame member 9. The location of the pivot 30 should be so selected with reference to the dimensions of the weight 31 as to assure stability of the overbalancing means 28 when it is in position against the stop means 9, and the mass of the weight 31 should be so selected with reference to the mass and location of the counterweight 23 that the overbalancing device 28 is capable, when connected to the ramp 14, of overcoming the force exerted on the ramp by the counterweight 23 and exerting a net force on the ramp tending to swing it downwardly.

Force transmitting means comprising an elongate, flexible member 33 such as a cable, rope, or the like has one of its ends connected to the stud 32 of the overbalancing device 28 and its other end connected to an ear 34 fixed on the lower surface of the ramp member 14. The point of connection of the cable 33 to the ramp member 14 is so selected that when the overbalancing device 28 is rocked clockwise, as viewed in Figures 3–5, the force of the falling weight 31 is transmitted to the ramp 14 to cause the latter to swing downwardly.

Means for effecting operation of the apparatus in response to movement of a vehicle towards the loading dock comprises a bumper frame member designated generally by the reference character 35 and composed of parallel side members 36 connected at corresponding ends by front and rear frame members 37 and 38, respectively. The spacing between the side frame members 36 corresponds substantially to the spacing between the members 8 of the supporting framework and the latter are provided with upstanding projections 39 on each of which is mounted a pair of vertically spaced rollers 40 by means of which the bumper frame member 35 is mounted for movements to and fro longitudinally of the frame members 8. The bumper frame member includes means such as springs 41 for yieldably maintaining the bumper frame member in a projected position such that its forward end extends beyond the forward end of the ramp member 14, the rear ends of the springs being connected to rings 42 or the like fixed on the rear member 38 and at their forward ends to rings 43 or the like fixed to plates welded or otherwise suitably secured to the frame member 9. The projected position of the bumper frame may be determined by cooperable stops 48 and 49 fixed on the frame member 8 and 36, respectively.

Near the ends of the front member 37 of the bumper frame member 35 is mounted in any convenient manner a pair of upstanding posts 45 adapted to be engaged by a vehicle V diagrammatically illustrated in Figures 3–5. Upon engagement of the bumper frame member 35 by the vehicle V, continued movement of the vehicle in the direction of the arrow $a$ will cause displacement of the bumper frame member 35 rearwardly from its first or projected position, shown in Figure 3, to a second position, shown in Figure 5, in which the forward end of the ramp 14 extends beyond the forward end of the bumper member 35. Rearward movement of the bumper frame member 35 may be limited by resilient blocks 46 mounted on the rear faces of the posts 45 in such positions as to bear against the front wall 4 of the dock. The resiliency of the blocks 46 prevents damaging the front wall of the dock.

Apparatus constructed in accordance with the invention includes motion transmission means designated generally by the reference character 50 for transmitting motion of the bumper frame member to swinging movement of the ramp 14. In the disclosed embodiment of the invention, the motion transmission means includes a rearwardly projecting arm 51 welded or otherwise suitably secured at its forward end to the bumper cross bar 37 and having rotatably mounted adjacent to its rearward end a pair of pulleys 52 and 53, between which the force transmitting cable 33 passes. The function of the pulleys 52 and 53 will be described in connection with the description of the operation of the apparatus.

When the parts of the apparatus are in their inactive positions and the apparatus is conditioned for operation, the bumper frame member 35 will be located in its forward or projected position due to the force exerted on the bumper frame by the springs 41. When the bumper frame member is in its projected position, the pulleys 52 and 53 also will be in a forwardly projected position, as a result of which the cable 33 will be pulled forwardly and held in a forward position due to the engagement of the cable by the pulley 53. In these positions of the parts, the pulley 53 becomes a cable holding device and the overbalancing device 28 will be in such position that the weight 31 is located forwardly of the vertical plane passing through the axis of the pivot 30 and will be forcibly held against the cross bar 9 partly by its own weight and partly by the force exerted by the cable 33. When the bumper frame member is in its forwardly projected position, the ramp member 14 desirably will be located in a substantially horizontal position. In these positions of the parts, the straight line distance from the post 32 to the ear 34 is considerably less than the length of the cable 33, so ordinarily the cable would be slack. In the projected position of the bumper frame member, however, the pulley 53 takes up the slack in the cable and the overbalancing device 28 keeps the cable taut so that the ramp is held in its horizontal position against the bias of the counterweight 23. Means such as supporting feet 54 may be welded or otherwise suitably fixed to the lower surface of the ramp 14 in a position to be engaged and supported by supporting members 55 fixed to the frame bars 36 of the bumper frame member, the supporting members 54 and 55 cooperating when the bumper frame member is in its forward position to support the ramp member 14 in its substantially horizontal, dock level position so as to permit cross traffic over the ramp.

When a truck or other vehicle V having a load carrying bed to be loaded or unloaded approaches the dock, the rear end of the vehicle first engages the posts 45 of the bumper frame member and exerts a force on the latter tending to push it rearwardly. During the initial stages of rearward movement of the bumper frame member, the pulleys 52 and 53 will move rearwardly also, the pulley 53 releasing the cable 33 and thereby tending to slacken the cable. Inasmuch as the weight 23 biases the ramp 14 to its raised position, however, the ramp 14 will be raised so as to take up the slack in the cable 33. Thus, as the vehicle V continues moving towards the dock, the movement of the motion transmission means 50 disables the overbalancing device 28 and enables the biasing means 23 automatically to swing the ramp upwardly out of harm's way.

When the bumper frame member has been pushed rearwardly a distance equal to about half its permissible rearward travel, the pulleys 52 and 53 will be in such positions that the cable 33 is transferred from the pulley 53 to the pulley 52 and the latter will exert a rearward pushing force on the cable which will be resisted by the biasing weight 23 to such an extent that the over-balancing device 28 is caused to shift or swing in a clockwise direction about its axis 30. The pulley 52 thus becomes what may be termed a motion transmitting device. When the weight 31 moves in a clockwise direction past top dead center, the device 28 will swing downwardly under its own weight and will exert a downward force on the ramp 14 via the cable 33 in such an amount as to overcome the force exerted by the biasing weight 23, thereby causing the ramp 14 to swing downwardly.

At the point where the overbalancing device 28 begins to swing downwardly under its own weight, the bumper frame member 35 will have been moved rearwardly to such a position that the ramp supporting elements 55 are clear of the associated supporting feet 54. Accordingly, the ramp 14 is capable of swinging downwardly to such position that its forward end may rest on the surface of the vehicle bed, even though the load carrying surface is substantially lower than the level of the ramp when the latter is horizontal. Such an arrangement is shown in Figure 5.

After the lip of the ramp member 14 has been brought to bear on the load carrying surface of the vehicle, goods to be loaded or unloaded may be trundled across the ramp 14. Inasmuch as the lip 17 of the ramp is relatively thin and rests on the bed of the vehicle, the goods are not subjected to severe shocks or jars caused by a gap between the vehicle bed and the dock or by significant differences in the levels of the vehicle bed and the dock.

Upon completion of the loading or unloading operations, the vehicle may be driven away from the dock, whereupon the springs 41 will exert a force on the bumper frame member urging it forwardly. Forward movement of the bumper frame will cause the pulley 53 to push against the force transmitting cable 33. At this time, therefore, the pulley 53 may be termed a motion transmitting device. The forward pushing force of the pulley 53 on the cable 33, coupled with the upward biasing force exerted on the ramp 14 by the counterweight 23 will cause the overbalancing device 28 to shift or swing counterclockwise about its axis 30. More or less simultaneously, the ramp supporting elements 55 on the bumper frame member will engage the supporting feet 54 so as to force the ramp member 14 upwardly and, if desired, the forward ends of the supporting elements 55 may be inclined as at 55a to assure smooth operation. The forward movement of the bumper frame member will continue under the influence of the springs 41 until the cooperating stop members 48 and 49 engage one another, at which time the parts of the apparatus again will be in the positions shown in Figure 3.

It will be noted from the foregoing description of the operation of the apparatus that, although the weight 23 exerts a constant force on the ramp tending to raise the latter, the biasing weight is disabled from operating except during initial movement of the bumper frame rearwardly from its forwardmost position and during initial forward movement of the bumper frame member from its rearmost position. Inasmuch as the ramp is biased to move upwardly upon initial rearward movement of the bumper frame, there is no necessity of providing cams or analogous devices for reaction between the bumper frame and the ramp.

The disclosed embodiment is representative of a presently preferred form of the invention, but is intended to be illustrative rather than definitive. The invention is defined in the claims.

I claim:

1. An adjustable loading ramp construction comprising support means; a ramp member; means mounting said ramp member on said support means for swinging movements from a normal, substantially horizontal position to raised and lowered positions; a bumper frame member; means mounting said bumper frame member on said support means for movements from and to a first position in which its forward end extends beyond the forward end of said ramp member to and from a second position in which the forward end of said ramp member overlies the forward end of said bumper frame member; biasing means supported by said support means and connected to said ramp member for constantly exerting a force on the latter tending to raise it from its said normal position; overbalancing means capable of overcoming the force exerted by said biasing means on said ramp member and exerting a net force on the latter tending to lower said ramp member; means mounting said overbalancing means below said ramp member for forward and rearward swinging movements in a substantially vertical plane about an axis of rotation; stop means supported at the forward side of said axis and in the path of movement of said overbalancing means for limiting movement of the latter in a forward direction; force transmitting means interconnecting said overbalancing means and said ramp member operable to transmit the force of said overbalancing means to said ramp member; means carried by said bumper frame member and having a slidable connection with said force transmitting means movable with said bumper frame member for exerting a pull on said force transmitting means when said bumper frame member moves from either of said positions to the other so as to swing said overbalancing means through said dead center position; and means urging said bumper frame member to said first position.

2. An adjustable loading ramp construction comprising a ramp member pivoted at its rearward end for swinging movements in an arc from a substantially horizontal position; biasing means connected to the said ramp member and constantly urging the latter to swing upwardly; overbalancing means supported below said ramp member; a bumper frame member interposed between said ramp member and said overbalancing means; means mounting said bumper frame member for sliding movement from a first position in which its forward end extends forwardly of said ramp member to a second position in which said ramp member overlies the forward end of said bumper frame member; force transmitting means interconnecting said ramp member and said overbalancing means; means on said bumper frame member slidably engaging said force transmitting means and exerting a force on the latter between said overbalancing means and said ramp member to overcome the force of said biasing means and hold said ramp member in said substantially horizontal position when said bumper frame member is in its said first position, said engaging means releasing its force on said force transmitting means as said bumper moves from its said first position toward its said second position, whereby said biasing means is enabled to swing said ramp member upwardly; and means urging said bumper frame member towards its said first position.

3. The construction set forth in claim 2 including means interposed between the lower surface of said ramp member and said bumper frame member and connected to one of said members for supporting said ramp member in substantially horizontal position when said bumper frame member is in its said first position.

4. An adjustable loading ramp construction comprising a ramp member hinged at its rearward end for swinging movements from a horizontal position; a bumper frame member mounted below said ramp member for sliding movements from a first position in which its forward end extends beyond the forward end of said ramp member to a second position in which the forward end of said ramp member overlies the forward end of said bumper frame member; biasing means connected to said ramp member and constantly exerting a force on the latter tending to swing it upwardly; overbalancing means mounted below said ramp member for swinging movements in a substantially vertical plane to positions at either side of a dead center position and being capable of overcoming the force of said biasing means; force transmitting means interconnecting said overbalancing means and said ramp member and transmitting to the latter the force of said overbalancing means for holding said ramp member in a lowered position when said bumper frame member is in either of said positions; operating means supported by said bumper frame member and slidably engaging said force transmitting means, said operating means being capable of swinging said overbalancing means via said force transmitting means from either of its positions at one side of dead center position to and beyond dead center position in response to movement of said bumper from either of said first and second positions to the other, the swinging of said overbalancing means to said dead center position enabling said biasing means to swing said ramp upwardly; and means urging said bumper frame member to said first position.

5. The construction set forth in claim 4 including means interposed between the lower surface of said ramp member and said bumper frame member and connected to one of said members for supporting said ramp member in substantially horizontal position when said bumper frame member is in its said first position.

6. An adjustable loading ramp construction comprising a ramp member hinged at its rearward end for swinging movements from a substantially horizontal position; biasing means connected to said ramp member and constantly exerting a force on the latter tending to swing it upwardly; overbalancing means capable of overcoming the force of said biasing means and pivotally mounted below said ramp member for swinging movements in a direction fore and aft of said ramp member about a substantially horizontal axis, said overbalancing means having a dead center position between its fore and aft positions; flexible force transmitting means interconnecting said overbalancing means and said ramp member for transmitting to the latter the force of said overbalancing means; a bumper frame member mounted below said ramp member and shiftable rearwardly from a first position in which its forward end extends beyond the forward end of said ramp member to a second position in which the forward end of said ramp overlies the forward end of the bumper frame member, and return; stop means supported in the path of forward movement of said overbalancing means for limiting forward movement of the latter in a position forwardly of its said dead center position; operating means on said bumper frame movable with the latter and slidably engaging said force transmitting means, said operating means exerting a pull on said force transmitting means such that said overbalancing means is enabled to overcome the force of said biasing means and hold said ramp member in its said substantially horizontal position when said bumper frame member is in its said first position and said overbalancing means is engaged by said stop means, the initial movement of said bumper frame member from its said first position towards its said second position causing said operating means to release its pull on said force transmitting means whereby said biasing means is enabled to swing said ramp member upwardly, further movement of said bumper frame member towards its said second position causing said operating means to exert a pull on said force transmitting means to swing said overbalancing means rearwardly to and beyond said dead center position, whereby said overbalancing means is enabled to exert a force on said ramp member via said force transmitting means to cause said ramp member to swing downwardly, return movement of said bumper frame member from its said second position to its said first position causing said operating means to exert a pull on said force transmitting means to swing said overbalancing means forwardly, whereby said overbalancing means is caused to be swung forwardly into engagement with said stop means; and means urging said bumper frame member towards said first position.

7. An adjustable loading ramp construction comprising a ramp member hinged at its rearward end for swinging movements from a normal, substantially horizontal position to raised and lowered positions; counterbalancing means connected to said ramp member and constantly exerting a net force thereon tending to raise said ramp member; overbalancing means capable of overcoming the force of said counterbalancing means and of exerting a net force on said ramp member tending to lower the latter; means mounting said overbalancing means below said ramp member for swinging movements in a substantially vertical plane and fore and aft of said ramp member and forwardly and rearwardly of a dead center position; flexible force transmission means interconnecting said overbalancing means and said ramp member, said force transmission means being of greater length than the distance between said ramp member and said overbalancing means when said overbalancing means is in said dead center position; a bumper member mounted beneath said ramp member for movement from a first position in which it extends beyond the forward end of said ramp member to a second position in which the forward end of said ramp member overhangs said bumper member; holding means on said bumper member having a slidable connection with said force transmission means for exerting a pull on said overbalancing means when said bumper member moves to its first position for swinging said overbalancing means forwardly of said dead center position whereupon gravity tends to swing said overbalancing means downwardly; means urging said bumper member towards its first position; and stop means supported in the path of movement of said overbalancing means for limiting forward swinging movement thereof, said holding means exerting a pull on said force transmission means to lower said ramp member when said overbalancing means is in engagement with said stop means and said bumper member is in said first position.

References Cited in the file of this patent
UNITED STATES PATENTS 2,751,615     Kelley _____ June 26, 1956

FOREIGN PATENTS 726,124     Great Britain _____ Mar. 16, 1955